United States Patent [19]

Ruckes et al.

[11] Patent Number: 4,843,107
[45] Date of Patent: * Jun. 27, 1989

[54] PROCESS FOR THE PREPARATION OF POLYAMINES AND THEIR USE FOR THE PREPARATION OF POLYURETHANES

[75] Inventors: Andreas Ruckes, Leverkusen; Werner Rasshofer, Cologne; Klaus König, Odenthal; Richard Kopp, Cologne, all of Fed. Rep. of Germany

[73] Assignee: Bayer Aktiengesellschaft, Bayerwerk, Fed. Rep. of Germany

[*] Notice: The portion of the term of this patent subsequent to Jun. 27, 2006 has been disclaimed.

[21] Appl. No.: 173,204

[22] Filed: Mar. 24, 1988

[30] Foreign Application Priority Data

Apr. 10, 1987 [DE] Fed. Rep. of Germany ....... 3712117

[51] Int. Cl.$^4$ .............................................. C08G 18/14
[52] U.S. Cl. ..................................... 521/155; 521/163; 528/44; 528/48; 528/52; 528/57; 564/305; 564/395; 564/414; 564/444
[58] Field of Search ................... 521/155, 163; 528/44, 528/48, 52, 57, 59; 564/305, 395, 414, 444, 445

[56] References Cited

U.S. PATENT DOCUMENTS

| 4,386,218 | 5/1983 | Rasshofer et al. | 564/38 |
|---|---|---|---|
| 4,515,923 | 5/1985 | Fauss et al. | 525/127 |
| 4,540,720 | 9/1985 | Rasshofer | 521/159 |
| 4,565,645 | 1/1986 | Rasshofer et al. | 252/182 |

FOREIGN PATENT DOCUMENTS 2948419 8/1981 Fed. Rep. of Germany.
3223400 6/1982 Fed. Rep. of Germany.

OTHER PUBLICATIONS

The Organic Chemistry of Nitrogen by N. V. Sidgwick, Clarendon Press, Oxford, p. 326, 1966.
Advanced Organic Chemistry: Reactions, Mechanisms, and Structure, by J. March, McGraw Hill, p. 658, 1968.
The Organic Chemistry of Nitrogen by N. V. Sidgwick, Claredon Press, Oxford, p. 236, 1966.

Primary Examiner—Maurice J. Welsh
Attorney, Agent, or Firm—Gene Harsh; Joseph C. Gil; Richard E. L. Henderson

[57] ABSTRACT

Polyamines containing primary amino groups are made by a one-shot process for the hydrolysis of prepolymers containing isocyanate end groups and having an isocyanate content of from 0.5 to 40 weight % with 0.75 to 40 mol of water per equivalent of isocyanate groups in the presence of very small quantities of sodium hydroxide in certain organic, polar solvents. The compounds containing isocyanate groups used for this process are isocyanate prepolymers (preferably containing urethane groups). Hydrolysis according to this process leads directly to the polyamines with elimination of carbon dioxide. These polyamines may be isolated by the usual methods and the removal of the small quantities of catalyst may advantageously be omitted. These polyamines are useful for the preparation of polyurethane(urea)s.

12 Claims, No Drawings

PROCESS FOR THE PREPARATION OF POLYAMINES AND THEIR USE FOR THE PREPARATION OF POLYURETHANES

BACKGROUND OF THE INVENTION

This invention relates to a one-shot process for the preparation of polyamines containing primary amino groups and a process for producing polyurethanes (ureas) therefrom.

It is known that isocyanates may be converted into amines by acid or basic catalysis, as disclosed e.g. in The Organic Chemistry of Nitrogen by N. V. Sidgwick, Clarendon Press, Oxford, page 236 (1966) and in Advanced Organic Chemistry: Reactions, Mechanisms and Structure, by J. March, McGraw-Hill Book Co., New York, page 658, (1968). Sidgwick mentions the possibility of alkaline hydrolysis of the isocyanate groups but only in general terms without specific details.

Both multistage hydrolysis processes (DE-A No. 2,948,419, DE-AS No. 3,039,600 and DE-OS No. 3,131,252) and single stage hydrolysis processes (No. 3,223,400/EP No. 97,299, DE-OS No. 3,223,398/EP No. 97,298 and DE-OS No. 3,223,397/EP No. 97,290) have been proposed. In the one-stage process disclosed in DE-OS No. 3,223,400, so-called "ethereal solvents" are used together with tertiary amines as catalysts. In the process disclosed in DE-OS No. 3,223,398, polar solvents such as dimethylformamide are used together with tertiary amines or relatively large quantities of alkali metal hydroxides, alkali metal silicates or alkali metal cyanides as catalysts. Polar solvents are used together with carbonates or carboxylates as catalysts in the process disclosed in DE-OS No. 3,223,397.

All of the known processes for the preparation of polyamines are more or less complicated. Even the known single stage processes could be further simplified. It would be desirable to have a simpler process which would enable more economic production of polyamines with even better conversion rates of NCO/NH$_2$ (i.e. higher NH$_2$ numbers) by a smoother reaction. For example, conventional processes could be improved so that: (1) no filtration is required; (2) no distillative separation of a tert.-amine catalyst is required; (3) the quantity of catalyst required could be reduced to a level such that the catalyst could be left in the polyamine; (4) quantitative conversion of NCO into NH$_2$ groups (high conversion rate of NCO/NH$_2$, i.e. high amine numbers, close to the theoretical value) is achieved; (5) formation of by-products which must be removed is avoided; and (6) working up of the polyamines and auxiliary substances may be done by a simple method.

SUMMARY OF THE INVENTION

It has now been found that these and other improvements may be achieved if the single stage hydrolysis of polyisocyanates to polyamines is carried out with certain water/NCO ratios using certain water-soluble organic solvents, minimum quantities of catalyst and under homogeneous reaction conditions.

In fact, under the conditions of the present invention, hydrolysis may even be carried out at low temperatures.

One considerable advantage of the process of the present invention is that the quantity of catalyst is so small that no catalyst or product of reaction between the CO$_2$ evolved and the NaOH (NaHCO$_3$ or NaCO$_3$) used as catalyst need be filtered off.

Since the catalyst suitable for the process is readily soluble in the reaction medium, no problems of distribution equilibria arise when rapidly sedimenting alkali metal carbonates or bicarbonates are used, such as may occur in the process according to DE-OS No. 3,223,397. The catalyst remains in solution or is fully miscible and need not be filtered off. The catalyst left in the end product generally does not interfere with further processing because it is present in very small quantities. Since no salts or catalyst residues need be removed after working up of the product, this method is also particularly suitable for the preparation of highly viscous or solid compounds containing amino groups from which it has hitherto been necessary to remove undissolved residues of salts or other catalyst material by very difficult processes.

The process of the present invention is also highly suitable for the hydrolysis of isocyanate prepolymers based on polyesters because the mild reaction conditions are not likely to result in splitting off of the ester groups.

DETAILED DESCRIPTION OF THE INVENTION

The present invention relates to a single stage process for the preparation of polyamines (preferably relatively high molecular weight polyamines) containing primary amino groups by the hydrolysis of isocyanate prepolymers in organic solvents containing water in the presence of a basic catalyst. More specifically, an isocyanate prepolymer having an isocyanate content of from 0.5 to 40 wt. %, preferably from 1.2 to 25 wt. %, most preferably from 1.5 to 10 wt. % and having a monomer content of at most 0.3 wt. %, (based on the prepolymer) are hydrolyzed with 0.75 to 40, preferably 1.5 to 10 mol of water per isocyanate equivalent in the prepolymer in the presence of from 0.001 to 0.02 wt. %, preferably from 0.005 to 0.02 wt. % (based on the prepolymer) of sodium hydroxide as basic catalyst in the presence of 10 wt. % (based on 100 wt. % of prepolymer) preferably from 20 to 2000 wt. %, most preferably from 40 to 100 wt. % of water-miscible polar organic solvent containing nitrile, ketone, sulfoxide or ether groups and boiling in the range of from 56° to 250° C. while a homogeneous reaction phase is maintained. This hydrolysis is carried out at temperatures of from 40° to 170° C., preferably from 50° to 130° C.

The present invention also relates to the polyamines obtained by this process, preferably polyamines containing from 0.46 to 9.52 wt. % of primary, preferably aromatically bound NH$_2$ groups.

The invention further relates to processes for the preparation of cellular or non-cellular polyurethane (urea)s by reaction of the polyamines of the present invention with polyisocyanates and optionally other compounds containing isocyanate reactive groups, optionally in the presence of known auxiliary agents and additives and/or solvents.

The isocyanate compounds used in the process of the present invention are isocyanate prepolymers of the type obtainable in a known manner by the reaction of low molecular weight and/or relatively high molecular weight compounds (molecular weight from 62 to about 12,000) containing hydroxyl and/or amino and/or thiol groups as reactive groups with an excess of polyisocyanate.

The polyisocyanates used for the preparation of the prepolymers containing free isocyanate groups may in principle be any aromatic or heterocyclic di- or polyisocyanates such as those described, for example, by W. Siefken in Justus Liebigs Annalen der Chemie, 562, pages 75–136 (1949) and those described on pages 15 to 25 of DE-OS No. 3,223,400. The low molecular weight and/or relatively high molecular weight compounds (in the molecular weight range of 32 and 60 to 12,000) which are suitable for these reactions containing hydroxyl and/or amino and/or thiol groups as reactive groups are also known and described in the above-named disclosures.

The isocyanate prepolymers used for the process of the present invention are preferably obtained from relatively high molecular weight polyols (molecular weight 400 to 12,000), preferably polyether polyols, optionally together with known chain lengthening agents (molecular weight 62 to 399) by their reaction with aromatic diisocyanates in an equivalent ratio (OH:NCO) of from 1:1.5 to 1:2.8, in particular about 1:1.5 to 1:2.

The isocyanate content of the isocyanate prepolymers used (preferably containing urethane groups) is generally from 0.5 to 40 wt. %, preferably from 1.2 to 25 wt. %, especially from 1.5 to 10 wt. % and the prepolymers should have a functionality of from 2 to 8, preferably from 2 to 4, more preferably from 2 to 3.

Isocyanate prepolymers of this type generally contain a certain proportion ($\geq 1\%$ by weight) of monomeric, low molecular weight polyisocyanates due to the method by which they have been prepared. For the process of this invention, however, only isocyanate prepolymers containing at most 0.3 wt. % of monomeric, low molecular weight polyisocyanates, based on the prepolymer, should be used. This low monomeric content may be achieved by, for example, reducing the amount of monomeric, low molecular weight polyisocyanates (e.g. TDI) in the isocyanate prepolymers by distillation, e.g. by means of a so-called thin layer evaporator. Alternatively, the prepolymer could be prepared with a subequivalent quantity of isocyanate, based on the "ideal" isocyanate prepolymer (NCO/OH ratio 2:1). Lastly, the proportion of monomeric, low molecular weight polyisocyanates may be reduced by using a "H-active" compound in the preparation of the isocyanate prepolymers as proposed in DE-OS No. 3,223,397.

Water is preferably used in liquid form in a quantity of $\geq 0.75$ mol, preferably $\geq 0.75$–40 mol, most preferably from 1.5 to 10 mol, based on one equivalent of NCO. NaOH is used as the catalyst.

The materials used as solvent are water-miscible, polar organic solvents containing nitrile, ketone, sulfoxide or ether groups which within the range of from 56° to 250° C. Aliphatic nitriles with 2 to 10 carbon atoms, aliphatic ketones with 2 to 10 carbon atoms, aliphatic sulfoxides with 2 to 10 carbon atoms and/or dioxane are preferred. Acetonitrile, acetone, methyl isopropyl ketone and/or dimethylsulfoxide are particularly preferred. The solvents may also be used as mixtures containing the various components in any proportions.

Certain limits with respect to the quantities (in particular the upper limits) of solvent used in the process should be observed. First, from 20 to 2000 wt. %, preferably from 40 to 1000 wt. % of solvent per 100 wt. % of isocyanate prepolymer should be used in the reaction mixture for hydrolysis. Second, sufficient water and optionally solvent should be used to form a substantially homogeneous (at the most slightly cloudy) solution or better still a homogeneous, clear solution with the isocyanate prepolymer at the reaction temperatures. It is particularly preferred to use sufficient water to form a monophasic mixture at all temperatures of the process but always within the stated ratio of water:NCO prepolymer.

The catalyst is generally added to the solvents and water. It could be added to the compound containing isocyanate groups but this is not preferred.

For hydrolyzing the isocyanate compound to polyamines with a sufficiently high amine number (high conversion rate), it is advantageous to maintain a concentration of isocyanate compound of $\leq 75$, preferably $\leq 55$ wt. % in the reaction mixture.

The hydrolysis reaction is preferably carried out in a homogeneous phase. Slight cloudiness of the reaction mixture may occur temporarily due to slight overdosing of water or of isocyanate prepolymer since the starting materials are then no longer completely dissolved.

If a multiphase reaction mixture is formed due to excessive addition of water so that the isocyanate prepolymer precipitates, unsatisfactory end products are obtained. Sufficient water must however be present to enable the quantity of catalyst used to dissolve homogeneously.

The hydrolysis reaction may be carried out at temperatures of 40° to 170° C., as already mentioned, but temperatures of from 50° to 130° .C are preferred because this temperature range provides the best volume/time yields combined with high solubility and, surprisingly, the least amount of urea chain-lengthening. Under special circumstances it may be necessary to carry out the reaction under pressure in order to enable sufficiently high temperatures to be reached. It should be noted, however, that the less polar and/or water-soluble the solvent put into the process, the higher must be the dilution and/or the quantity of catalyst and/or temperature (may be obtained by raising the pressure) in order that high NCO/NH$_2$ conversion rates may be obtained. If the quantity of catalyst is increased, it may be necessary to increase the quantity of water in order to ensure complete solution of the catalyst in the reaction mixture.

The optimum mixing ratios of any given set of starting compounds for achieving homogeneous mixing while observing the required ratios may be determined by a few preliminary tests.

The onset of the reaction is recognized by the almost spontaneous liberation of $CO_2$, which may be observed even at low temperatures, e.g. 10° C. However, it is much more advantageous to employ the higher temperatures indicated above in order to suppress urea formation. It is important to ensure very thorough and rapid mixing to form a homogeneous solution of the reactants. This is mainly achieved by using solvents but the reduction in viscosity which occurs when relatively high reaction temperatures are employed acts in the same manner. The reaction may be carried out continuously or batchwise. The disclosure in DE-OS No. 3,223,397, page 32, line 20 to page 35, line 10 is applicable to both continuous and batchwise embodiments of the process.

Working up of the reaction mixture may also be carried out either continuously or batchwise. Known methods such as extraction, phase separation or distillation may be employed.

The reaction mixture is preferably worked up without phase separation. After completion of the reaction (no further evolution of $CO_2$ observed), the solvent or solvent/water mixture is distilled off, preferably with application of a vacuum, e.g. from 1 to 700 Torr, although a still higher vacuum, e.g. from 0.001 to 1 Torr, may be applied for the removal of volatile residues. It has been found suitable to employ temperatures initially in the range of about 60° to 100° C. and later from 80° to 100° C. The solvent distilled off may be used again, possibly several times.

The polyamines obtained after working up of the reaction mixture are generally colorless to slightly colored, medium viscosity to high viscosity and optionally relatively high melting products having the amino group contents already mentioned. Depending upon their starting materials, these polyamines also contain urethane and/or urea and/or uretdione and/or isocyanurate and/or biuret groups and/or uretone imine groups and optionally ether and/or acetal and/or carbonate and/or ester and/or thioether and/or dialkylsiloxane groups and/or residues of polybutadienes previously present in the isocyanate compounds. Additional bonds may form as a result of side reactions, e.g. urea groups may form in the process of hydrolysis from components which have already saponified and isocyanate groups still remaining from the starting materials.

The quantity of primary aromatic amino groups present in the polyamines at most corresponds to the quantity of isocyanate groups present in the isocyanate compounds, i.e. about 0.19 to 15.23 wt. % of $NH_2$ (when the isocyanate group content is from 0.5 to 40 wt. %), preferably from 0.46 to 9.52 wt. % of $NH_2$ (when the isocyanate group content is from 1.2 to 25 wt. %) and most preferably from 0.58 to 3.81 wt. % of $NH_2$ (isocyanate content of from 1.5 to 10% wt. %).

Due to their low vapor pressure, the polyamines obtained by the process of the present invention, which are preferably aromatic, may be advantageously used as reactants for free or blocked polyisocyanates in the preparation of polyurethanes (polyurethane ureas), optionally cellular polyurethane resins or polyurethane foams. These polyamines may be combined with other, low molecular weight (molecular weight from 32 to 399) and/or relatively high molecular weight (molecular weight from 400 to about 12,000) compounds containing isocyanate reactive groups to produce such resin and foams. Known starting components suitable for the preparation of polyurethane resins are mentioned above in connection with the preparation of prepolymers as well as in DE-A No. 2,302,564, DE-A No. 2,432,764 (U.S. Pat. No. 3,903,679) and in DE-A Nos. 2,639,083, 2,512,385, 2,513,815, 2,550,796, 2,550,797, 2,550,833, 2,550,860 and 2,550,862. These references also mention auxiliary agents and additives optionally used for the preparation of polyurethanes.

Processes for the preparation of polyurethane (urea)s using the polyamines obtained by the process of this invention are also a subject of the present invention. The polyurethane(urea) products which may be produced include elastomers, coatings, and filaments applied from melts, solutions, dispersions or reactive component mixtures.

Other applications for the polyamines prepared according to the present invention include their use as coupling componens for diazo dyes and hardeners for epoxide and phenol resins and their use in any other known reactions of amines, such as the formation of amides or imides, and others.

The invention is further illustrated but is not intended to be limited by the following examples in which all parts and percentages are by weight unless otherwise specified.

EXAMPLES

EXAMPLE 1

The prepolymer having an isocyanate content of 3.6% which had been used in this example was subjected to thin layer evaporation. It had been prepared by 3 hours' stirring of a mixture of a polyether mixture (2:1 mixture of trimethylolpropane, $H_2O \leftarrow$propylene oxide and glycerene$\leftarrow$propylene oxide$\leftarrow$ethylenoxide) with an OH number 50.1 and toluyene-2,4-diisocyanate in an equivalent ratio of NCO:OH=2:1 at 80° C. The monomeric content was 0.23%.

A mixture of 1500 g of acetonitrile, 25 g of water (acetonitrile/water ratio=60:1; 3.24 mol of water per isocyanate equivalent) and 0.075 g of NaOH (0.015 wt. % based on the isocyanate prepolymer) was introduced into a reaction vessel and heated to reflux. 500 g of the prepolymer described above were added within 15 minutes.

After addition of all the prepolymer, the mixture was stirred for 5 minutes (evolution of $CO_2$ rapidly died down) and acetonitrile and water were then distilled off by the application of a vacuum (initially 19.5 mbar, then 0.13 mbar at 80°-100° C.). The product polyamine had an NH number ($HClO_4$) of 43.36 mg KOH/g.

EXAMPLE 2

A mixture of 1000 g of acetonitrile, 40 g of water (acetonitrile/water ratio=25:1; 5.1 mol of water per isocyanate equivalent) and 0.05 g of NaOH (0.01 wt. %, based on the isocyanate prepolymer) was introduced into a reaction vessel and heated to reflux. 500 g of the prepolymer from Example 1 having an isocyanate content of 3.6% were added within 15 minutes. The reaction mixture was worked up as in Example 1. The product polyamine had an NH number ($HClO_4$) of 40.31 mg KOH/g.

EXAMPLE 3

A mixture of 1500 g of acetonitrile, 40 g of water (acetonitrile/water=37.5:1, 5.1 mol of water per isocyanate equivalent) and 0.075 g of NaOH (0.015 wt. % based on the isocyanate prepolymer) was introduced into the reaction vessel and heated to reflux. 500 g of the prepolymer from Example 1 having an isocyanate content of 3.6% were added within 15 minutes. The reaction mixture was worked up as in Example 1. The product polyamine had an NH number ($HClO_4$) of 43.22 mg KOH/g.

EXAMPLE 4

A mixture of 1370 g of acetonitrile, 25 g of water (acetonitrile/water ratio=54.8:1; 3.24 mol of water per isocyanate equivalent) and 0.1 g of NaOH (0.02 wt. % based on the isocyanate prepolymer) was introduced into a reaction vessel and heated to reflux. 500 g of the prepolymer from Example 1 having an isocyanate content of 3.6% were added within 15 minutes. The reaction mixture was worked up as in Example 1. The product polyamine had an NH number ($HClO_4$) of 42.8 mg KOH/g.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. A single stage process for the production of a polyamine containing primary amino groups in which
   (a) an isocyanate prepolymer having an isocyanate content of from 0.5 to 40 wt. % and having a monomer content of no more than 0.3 wt. %
   is hydrolyzed with
   (b) 0.75-40 mol of water per isocyanate equivalent of (a)
   in the presence of
   (c) 0.001-0.02 wt. % sodium hydroxide and
   (d) at least 10 wt. % water-miscible polar organic solvent containing nitrile, ketone, sulfoxide and/or ether groups which boils at 56°-250° C. in substantially homogeneous phase at 40° to 170° C.

2. The process of claim 1 in which (a) has an isocyanate content of from 1.2 to 25 wt. %.

3. The process of claim 1 in which (a) has an isocyanate content of from 1.5 to 10 wt. %.

4. The process of claim 1 in which the hydrolysis is carried out at 50° to 130° C.

5. The process of claim 1 in which (c) is used in a quantity of 0.005-0.02 wt. %.

6. The process of claim 1 in which (d) is used in a quantity of 20 to 2000 wt. %.

7. The process of claim 1 in which (d) is used in a quantity of 40 to 1000 wt. %.

8. The process of claim 1 in which (b) is used in a quantity of from 1.5 to 10 mol per equivalent of isocyanate.

9. The process of claim 1 in which (d) is selected from acetone, acetonitrile, methyl isopropyl ketone, dimethyl-sulfoxide and mixtures thereof.

10. A polyamine containing 0.46 to 9.52 wt. % primary amine groups produced by the process of claim 1.

11. The polyamine of claim 10 in which the primary amine groups are aromatically bound.

12. A process for the production of a polyurethane(urea) in which the polyamine of claim 10 is reacted with a polyisocyanate and optionally another compound containing isocyanate reactive groups.

* * * * *